(12) United States Patent
Strömberg

(10) Patent No.: US 8,467,192 B2
(45) Date of Patent: Jun. 18, 2013

(54) METHOD FOR PRODUCING A ROLLABLE WEB AND A ROLLABLE WEB

(75) Inventor: Samuli Strömberg, Tampere (FI)

(73) Assignee: Smartrac IP B.V., Amsterdam (NL)

( * ) Notice: Subject to any disclaimer, the term of this patent is extended or adjusted under 35 U.S.C. 154(b) by 348 days.

(21) Appl. No.: 12/988,840

(22) PCT Filed: Apr. 20, 2009

(86) PCT No.: PCT/FI2009/050288
§ 371 (c)(1),
(2), (4) Date: Jan. 10, 2011

(87) PCT Pub. No.: WO2009/130379
PCT Pub. Date: Oct. 29, 2009

(65) Prior Publication Data
US 2011/0090653 A1  Apr. 21, 2011

(30) Foreign Application Priority Data
Apr. 21, 2008  (FI) .................................. 20085337

(51) Int. Cl.
*H05K 1/00* (2006.01)

(52) U.S. Cl.
USPC ........... 361/749; 235/487; 235/488; 235/492; 257/679; 257/684; 257/701; 257/783; 340/539.26; 340/572.8; 156/301; 702/122; 324/633; 29/846; 343/720; 252/500; 40/638; 438/222; 438/584; 438/613; 428/40.1

(58) Field of Classification Search
USPC .............. 361/749; 455/41.1; 235/487, 488, 235/492; 257/679, 684, 701, 783; 340/539.26, 340/572.8; 156/301, 145.6; 702/122; 324/633; 29/846; 343/720; 252/500; 40/638; 438/222, 438/584, 613; 428/40.1
See application file for complete search history.

(56) References Cited

U.S. PATENT DOCUMENTS

| | | | | |
|---|---|---|---|---|
| 6,669,909 B2 * | 12/2003 | Shvets et al. | .................. | 422/502 |
| 6,842,606 B1 * | 1/2005 | Takemura | .................... | 455/41.1 |
| 7,206,010 B2 * | 4/2007 | Maghakian | ................... | 347/214 |
| 7,359,823 B2 * | 4/2008 | Forster | .......................... | 702/122 |

(Continued)

FOREIGN PATENT DOCUMENTS

| | | |
|---|---|---|
| EP | 1018703 A1 | 7/2000 |
| EP | 1089220 A1 | 4/2001 |

(Continued)

OTHER PUBLICATIONS

PCT/ISA/210—International Search Report—August 27, 2009.
Finnish Office Action Issued March 10, 2009.
Translation of Finnish Report Report.

*Primary Examiner* — Xiaoliang Chen
(74) *Attorney, Agent, or Firm* — Venable LLP; Eric J. Franklin

(57) ABSTRACT

A method for producing a rollable web with successive antennas, where an electronic chip is attached to an antenna in a predetermined position. The position of an electronic chip changes with respect to the antenna when compared to at least some of the chips within individual and successive antennas. A rollable web includes successive antennas, where electronic chips are attached to antennas in a predetermined position. In the rollable web, the position of a chip changes with respect to the antenna compared to at least some of the chips within individual and successive antennas.

10 Claims, 3 Drawing Sheets

U.S. PATENT DOCUMENTS

| | | | |
|---|---|---|---|
| 7,837,123 B2 * | 11/2010 | Phillips | 235/492 |
| 8,020,453 B2 * | 9/2011 | Kreit et al. | 73/862.331 |
| 8,093,912 B2 * | 1/2012 | Garreau et al. | 324/639 |
| 8,148,298 B2 * | 4/2012 | Kutami et al. | 503/201 |
| 2003/0136503 A1 | 7/2003 | Green et al. | |
| 2007/0181726 A1 | 8/2007 | Ishikawa et al. | |

FOREIGN PATENT DOCUMENTS

| | | |
|---|---|---|
| EP | 1626362 A1 | 2/2006 |
| FI | 20050191 | 10/2006 |
| WO | WO-2006087423 A1 | 8/2006 |

* cited by examiner

METHOD FOR PRODUCING A ROLLABLE WEB AND A ROLLABLE WEB

CROSS-REFERENCE TO RELATED APPLICATIONS

This application claims priority to Finnish patent application 20085337 filed 21 Apr. 2008 and is the national phase under 35 U.S.C. §371 of PCT/FI2009/050288 filed 20 Apr. 2009.

FIELD OF THE INVENTION

The present invention relates to a rollable web, the rollable web comprising successive antennas supported by the web and electronic microcircuit chips arranged in connection with said antennas. The invention relates further to a method for producing such a web.

BACKGROUND OF THE INVENTION

Radio Frequency Identification (RFID) technology is becoming widely used to identify and control the flow of goods, for instance, to identify packages, pallets and parcels, or RFID tags or tickets or labels (hereafter the term "tag" also covers tickets or labels) are used in conjunction with security-locks in cars and for access control in buildings. Heretofore, RFID tags have been applied to goods in various ways. They may be glued to the article surface, taped, or otherwise merged into the product itself. A variety of substrate materials are used to produce such tags and an economic way to produce the tags is to manufacture them in a web format making use of large quantity roll-to-roll type manufacturing methods.

It is necessary to roll such webs in order to store and transport them in an effective manner. In a tightly packaged roll having a web with tags comprising antennas and microelectronic chips, the chips (with certain height) in the web roll tend to become stacked on top of each other in consecutive rounds of the roll. This causes mechanical stress on the chips and results in breaking of the chips, and as a consequence, neither the chip nor the antenna works properly.

The problem can be solved, for example, by overlaminating the tags where a microelectronic chip is placed in a specific cavity so that the structure has a more constant thickness. However, this is, of course, an expensive way to solve the problem.

One solution to this problem is disclosed in the publication US2007181726A by Ishikawa et al, where a series of RFID tags is rolled around a reel core formed by a core material, and a stress absorbing material is wrapped around the core material to absorb the stress produced in reeling the series of RFID tags. Therefore, defects such as breaking of the antenna or damaging of the chip can be avoided to a greater extent. This kind of a solution, however, needs more production material and space when storing or transporting these rolls.

There is a need for a method which produces rollable webs in which the microelectronic chips could remain undamaged during storage and transport.

SUMMARY OF THE INVENTION

The present invention is based on a method of attaching an integrated circuit (herein a microelectronic chip or chip) on a tag arranged on a rollable substrate web with successive antennas supported by the web, where a chip is attached to an antenna in a predetermined position so that the position of the chip slightly changes in respect of the antenna, when compared to at least some of the chips arranged with individual and successive antennas so that a stacking effect and stress on the chips are avoided or at least reduced in the web roll.

The aim of the present invention is to create a rollable web with RFID tags comprising antennas and chips, wherein the chips have electrically connected to the antennas within individual and successive tags, and wherein a stacking effect in the web roll and stress on the chips during the rolling of the web are avoided or at least reduced.

A typical RFID tag is in the form of a small sheet, comprising a flat antenna formed on a plastic or paper film and a small micro-processor, or a chip, attached to the antenna.

The chip can be a silicon chip, or a polymer chip. The integrated circuit typically comprises an escort memory and an RF part which communicates with a reader device. The antennas are formed on a long belt-like and flexible backing web. Suitable materials for the backing web include paper, polyester, biaxially orientated polypropylene, or polycarbonate. Many other materials are also available for the backing web, provided that the material is sufficiently resistant to heat and chemicals. The antenna is typically made of aluminum, copper, silver, or a conductive polymeric material, and it is formed on the substrate for example by etching, printing, electrolysis, plating, or by some other additive techniques. It is also possible that the antenna is manufactured on a first substrate, and when it is ready it is transferred to a second substrate which is the backing web. The antenna can be a coil antenna, or an antenna based on the dipole antenna technique, or an antenna based on some other planar antenna technique. The chip is electrically connected to the antenna, and it can be attached to the antenna either directly or via a module part which comprises the chip and required electrical contacts. The term "electrically connected" also covers capacitive connections.

Usually one chip is attached per one antenna on the backing web on the process line. There are many techniques available for attaching the chip to the antenna. The chip can be attached with or without an underfill. The chip can be attached by a solder bump with or without the underfill. A solder bump made of a soldering paste can be attached without the underfill. A metallic solder bump, such as a bump of gold or a mixture of gold and nickel, can be attached with the underfill. As the underfill, it is possible to use an isotropically conductive adhesive, a non-conductive adhesive or an anisotropically conductive adhesive.

A typical web is flexible and has an elongated belt-like form, comprising a backing web, the backing web having a longitudinal direction and a cross-direction, and containing RFID tags comprising an antenna and a chip attached to the antenna formed on the backing web. The longitudinal direction means the direction in which the web moves in a process. The web may comprise an overweb which protects the antennas and the chips. The overweb may be adhesively attached to the backing web. The web may comprise only one tag in the cross-direction of the web, but it is also possible that the web comprises parallel tags in the cross-direction of the web.

It is advantageous to design the antennas used in webs so that the chips could be positioned into several alternative positions within successive antennas. The number of the possible positions of the chips depends, for example, on the antenna, the materials used and the junction area. There could be, for example, six different positions for a chip. Only a minor change of the position is sufficient, for example 0.5 to 1 mm in the longitudinal direction or in the cross-direction. It is advantageous to use such minor changes between the positions that a chip installing machine could be adjusted to handle the changes in the positions of the chips attached to antennas. Preferably, a position is predetermined, said position defining the order in which the chip installing machine should position the chips onto the antennas for achieving the best result. This order can be systematic, where a position of a chip changes within individual and successive antennas or between successive sequences of antennas or in some combination of these, or the order can be random. Thus, when the position of the chip changes compared to at least some of the chips in appropriate way and with a predetermined position, the chips would not stack within successive web layers of the roll. Even if small position changes of the chip are preferable in view of the typical chip installing machine operation, it is also possible to vary the location of the chips in successive antennas significantly, for example locating the chips in the opposite ends of the successive antennas. Further, it is not necessary to maintain the location of the successive antennas in the web the same, but it is also possible to alter the location or orientation of the antennas on the web. This allows for distributing the chips over a larger area in cross-direction of the web and thus producing a more even cross-directional profile of the roll.

The method is a cost-effective way to ensure the quality of tags, webs and web rolls and easy to put in to use, because chip installing machines can be adjusted to handle the changes of the positions.

DESCRIPTION OF THE DRAWINGS

In the following, the invention will be described with reference to the appended figures in which.

DETAILED DESCRIPTION OF THE INVENTION

Figure 1:
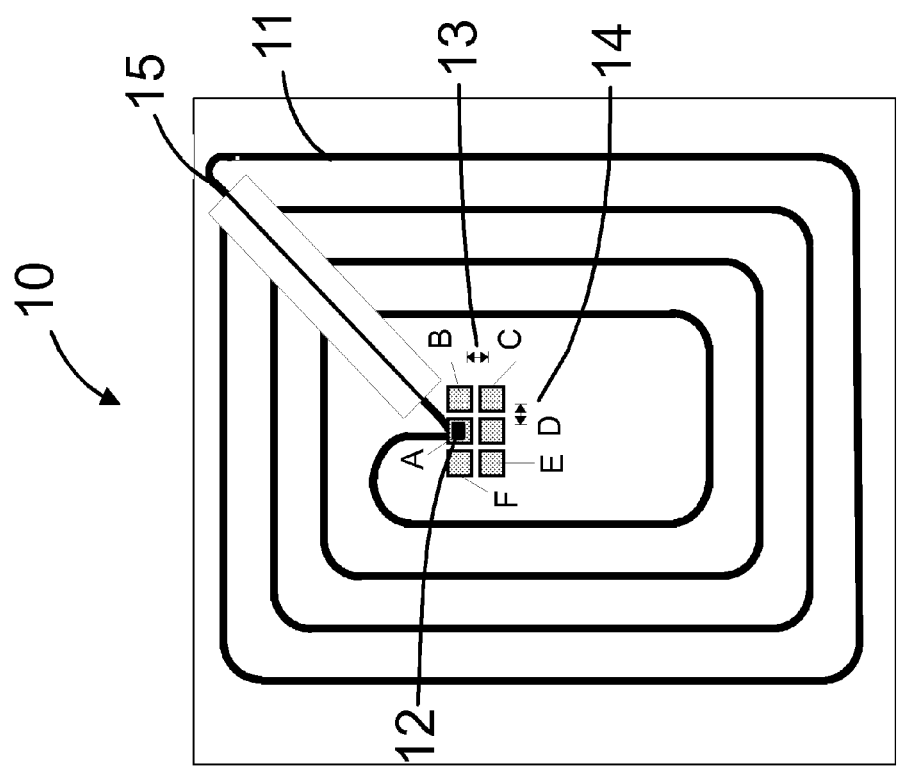
FIG. 1 shows a front view of a tag with six alternative positions for a chip.

FIG. 1 shows a front view of one embodiment of the invention. A tag 10 comprising an antenna 11 and an integrated circuit on a chip 12 are formed on the surface of a substrate 15. The chip 12 is attached to the position A of the antenna 11. The antenna 11 is designed so that there are five other alternative positions B-F for attaching a chip 12 to the antenna 11. There should be only a minor chance in the longitudinal direction 13 or in the cross-direction 14 between alternative positions A-F. This change 13 or 14 could be for example 0.5 to 1 mm.

Figure 2:
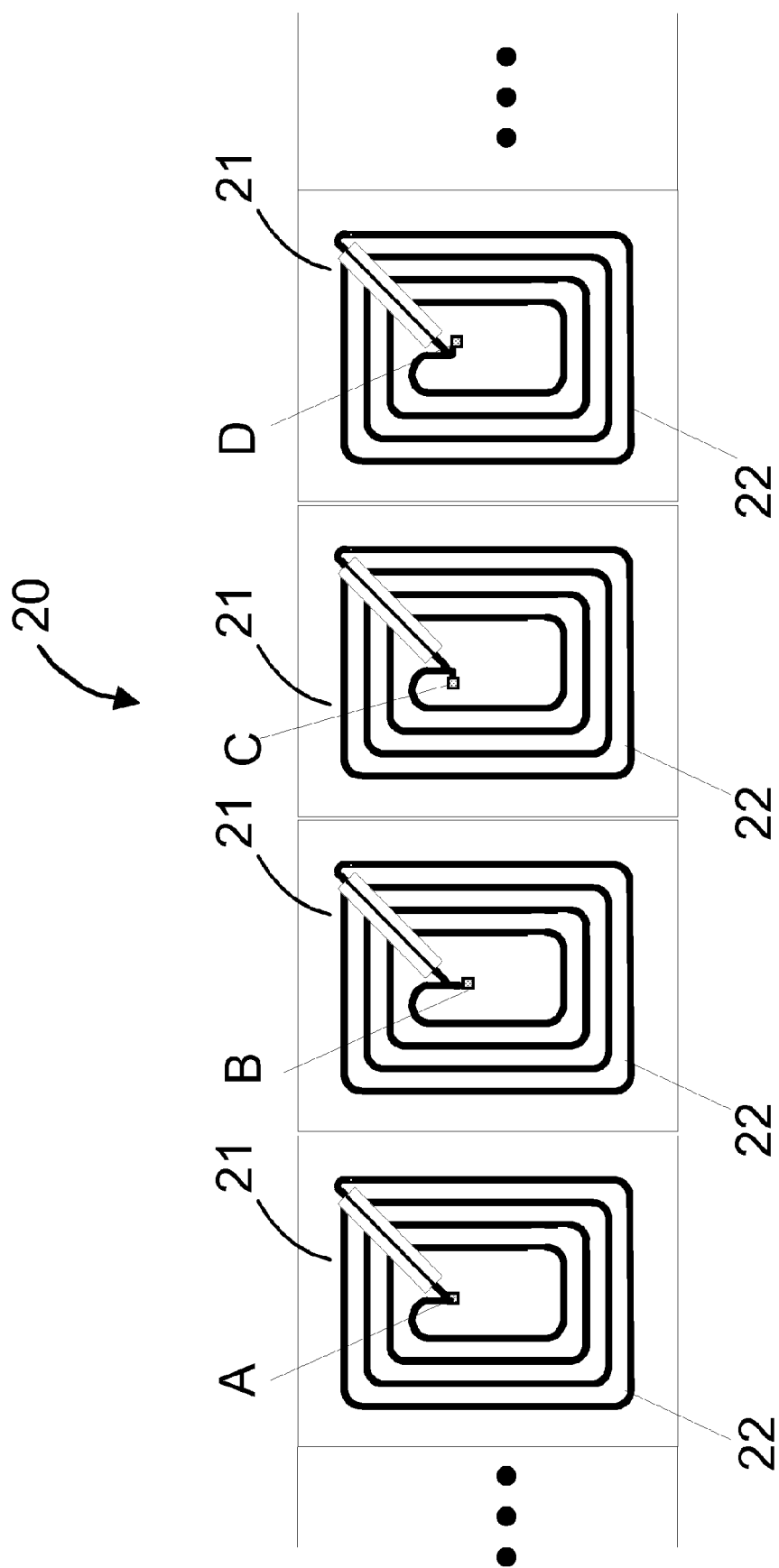
FIG. 2 shows a front view of a piece of web with tags, wherein the position of the chips attached to the antenna changes within individual antennas.

FIG. 2 shows a front view of one embodiment of the invention. RFID tags 21 are formed on a piece of a long belt-like, rollable, and flexible backing web 20. The tags 21 are formed consecutively, and in each individual tag 21 the position A-D of the chip attached to antenna 22 with a predetermined position has slightly changed in respect of the antenna 22, when compared to the other chips.

Figure 3:
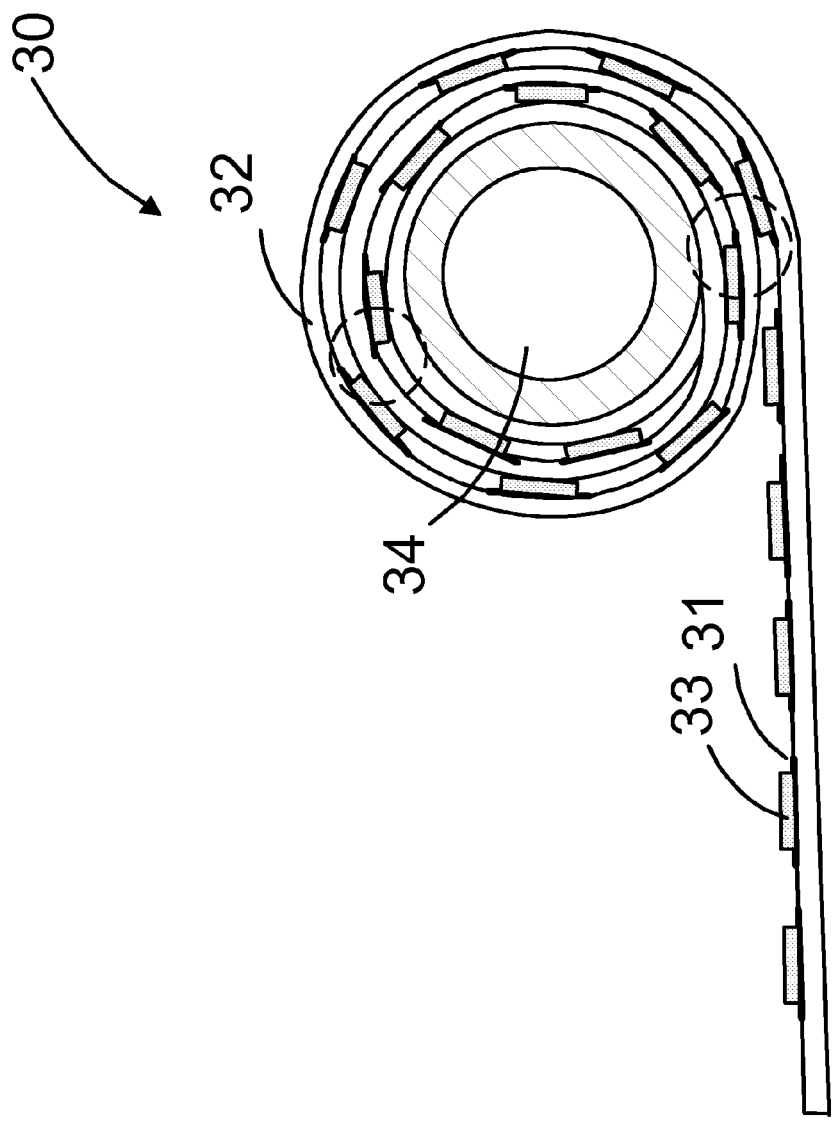
FIG. 3 shows a web roll formed by rolling a series of RFID tags with antennas and chips attached to the antennas.

FIG. 3 shows a web roll 30. The web roll 30 is formed by rolling a web 32 with several RFID tags 31 around a reel core 34. As the positions shown by the circles indicate, the chips 33 do not overlap. Therefore, the present invention could reduce the amount of broken chips 33 by slightly changing the position of a chip 33 with respect to the antenna in the tags 31, when compared to at least some of the other chips.

The above-mentioned embodiments do not restrict the scope of the invention. It is possible that there are a smaller or larger number of alternative positions for the chip. The change between alternative positions could be anything within the range of adjustability of the chip installing machine. It should be noticed that the antennas should be designed so that there are at least two alternative positions for the chips to be attached to antennas. This slight change of the position of the chip in the individual and successive tags makes it possible to avoid or at least reduce a stacking effect in the web roll and the stress on the chips when rolling the web.

The invention claimed is:

1. A method for producing a rollable web, the method comprising:
   introducing a web comprising successive antennas, the web having a longitudinal direction and a cross-direction; and
   attaching an electronic chip to an antenna in a predetermined position so that the position of the chip changes with respect to the antenna, when compared to at least some of the chips within individual and successive antennas.

2. The method according to claim 1, wherein the position of the chip changes in the longitudinal direction.

3. The method according to claim 1, wherein the position of the chip changes in the cross-direction.

4. The method according to claim 1, wherein the change of the position is from 0.5 to 1 mm.

5. The method according to claim 1, wherein the position of the chip changes between successive sequences of antennas.

6. A rollable web, comprising:
   a web comprising successive antennas, the web having a longitudinal direction and a cross-direction; and
   electronic chips attached to antennas in a predetermined position so that the position of a chip changes with respect to the antenna compared to at least some of the chips within individual and successive antennas.

7. The rollable web according to claim 6, wherein the position of the chip changes in the longitudinal direction.

8. The rollable web according to claim 6, wherein the position of the chip changes in the cross-direction.

9. The rollable web according to claim 6, wherein the change of the position is from 0.5 to 1 mm.

10. The rollable web according to claim 6, wherein the position of the chip changes between successive sequences of antennas.

* * * * *

UNITED STATES PATENT AND TRADEMARK OFFICE
CERTIFICATE OF CORRECTION

| | | |
|---|---|---|
| PATENT NO. | : 8,467,192 B2 | Page 1 of 1 |
| APPLICATION NO. | : 12/988840 | |
| DATED | : June 18, 2013 | |
| INVENTOR(S) | : Samuli Stromberg | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 428 days.

Signed and Sealed this
Fifteenth Day of October, 2013

Teresa Stanek Rea
*Deputy Director of the United States Patent and Trademark Office*